INVENTOR
TENNY D. LODE

Jan. 30, 1968 T. D. LODE 3,366,957
DISTANCE MEASUREMENT METHOD AND MEANS
Filed Aug. 31, 1965 2 Sheets-Sheet 2
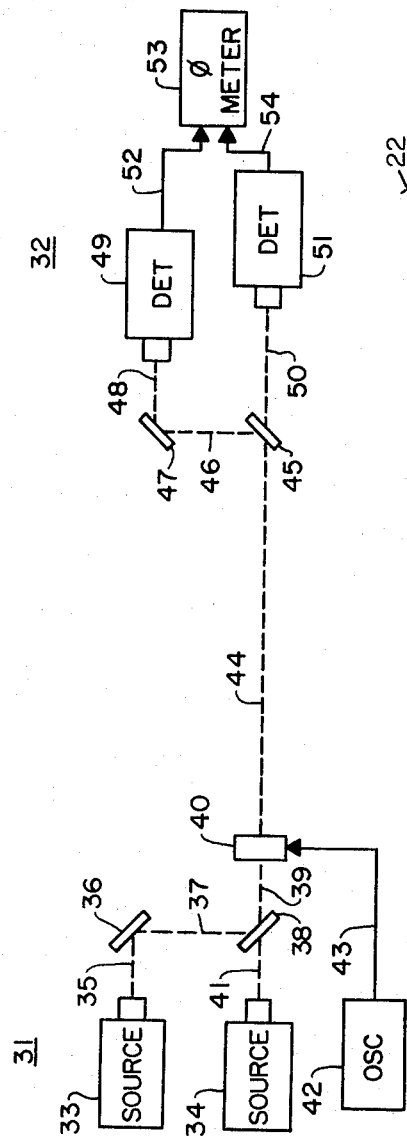
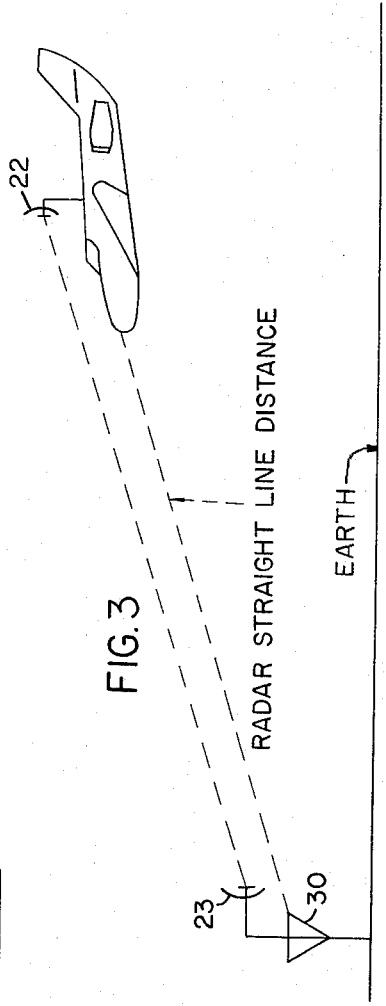
INVENTOR
TENNY D. LODE

United States Patent Office 3,366,957
Patented Jan. 30, 1968

3,366,957
DISTANCE MEASUREMENT METHOD
AND MEANS
Tenny D. Lode, Madison, Wis., assignor to Rosemount Engineering Company, Minneapolis, Minn., a corporation of Minnesota
Filed Aug. 31, 1965, Ser. No. 483,927
3 Claims. (Cl. 343—112)

ABSTRACT OF THE DISCLOSURE

Apparatus for transmitting electromagnetic wave signals of two different frequencies along a transmission path and measuring the difference in time of travel of the signals over the path. The time of travel of each signal is dependent upon frequency, path length, and medium composition so that path length may be determined from the measurement. Such a measurement over a known path length which traverses atmosphere having a known variation of density with altitude between the earth's surface and an aircraft provides an altitude measurement of the aircraft.

---

This invention relates to the measurement of quantities such as distance or position via the transmission and reception of electromagnetic wave signals. More particularly, it relates to methods and means which allow such measurements to be made with only receiving equipment at one end of a distance to be measured.

A conventional method of measuring distances has been to transmit an electromagnetic wave signal from a first station to a second station where it is retransmitted back to the first station. The time required for the electromagnetic wave signal to make the round trip is a measure of the distance between the two stations. A disadvantage of this method is that it requires the radiation of electromagnetic wave signals from both stations. Except for very short distances, this usually requires either transmitting equipment at both stations or the use of a high power transmitter at one station to obtain a measurable echo from a simple reflector at the second station. An object of this invention is to allow electromagnetic wave distance measurements without transmission of a signal in both directions over a path. A further object is to allow electromagnetic wave distance measurements without transmitting equipment at one of the stations, and without requiring reflection of a signal.

For aircraft navigation it may be desired to measure the distances of many aircraft from a common ground navigation station. The distance measurement should be available on board the aircraft and may or may not be made available at the ground station. Conventional distance measuring systems transmit pulse signals back and forth between the ground station and each aircraft using that particular station. A significant part of the complexity of such conventional systems arises because each aircraft must select the ground station signals transmitted in response to signals previously transmitted by that particular aircraft. Signals transmitted by the ground station in response to other aircraft must somehow be ignored. As the number of aircraft using a common ground station increases, the problem becomes more complex. An object of this invention is to allow the measurement of the distance of an aircraft from a ground station with only receiving equipment on board the aircraft and without requiring the transmission of signals back and forth between the aircraft and the ground station.

In certain military applications, it may be desirable to measure distances between two stations while maintaining radio silence at one station. An object of this invention is to allow the measurement of distance via the transmission of electromagnetic wave signals from one station to another while maintaining radio silence at the receiving station.

Altitude can usually be measured with much greater precision than geographic position from on board an aircraft. For this reason, it has been customary in air traffic control to route aircraft with vertical separations of 1000 ft. or less while requiring horizontal separations of many miles. However, it is often difficult to measure such altitude differences with air traffic control radar. The use of transponders, which transmit a signal in response to a signal from a ground radar, is becoming more common. An object of the present invention is to allow the measurement of altitude, in addition to slant range distance, without requiring the measurement and transmission of altitude information by individual aircraft.

Other objects and advantages may be seen by reference to the drawings and to the following specification and the claims.

In a particular form of this invention, a system may be arranged to measure a distance between a transmitting subsystem and a receiving subsystem. At the transmitting subsystem two electromagnetic wave signals of different frequencies are simultaneously modulated at a third frequency and transmitted. As will be explained later in the specification, these two signals will travel at slightly different velocities to the receiving subsystem. At the receiving subsystem, the two signals are demodulated and the difference in modulation phase of the two received signals is measured. This phase difference is a measure of the distance between the transmitting and receiving subsystems.

In the drawings:

FIGURE 2 is a block diagram and schematic illustration of a second form of the invention, employing a combination of optical and electronic techniques.

FIGURE 3 is a schematic illustration showing the application to measurement of altitude of an aircraft.

Figure 1:
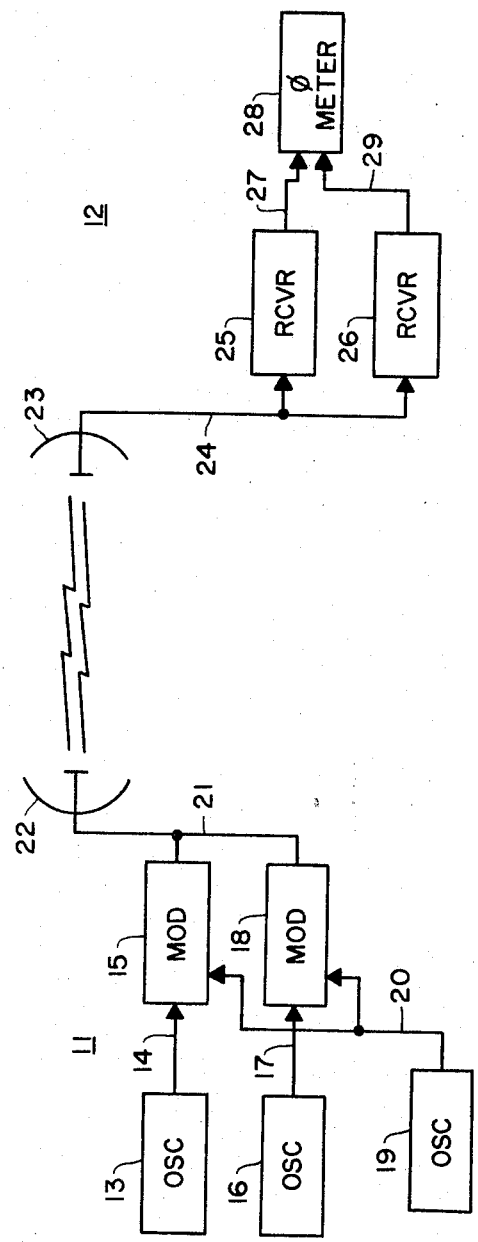
FIGURE 1 is a block diagram of a first form of the invention, employing radio techniques.

Referring now to the drawings, FIGURE 1 includes transmitting subsystem 11 and receiving subsystem 12. Transmitting subsystem 11 includes oscillator 13 which connects via line 14 to a first input of modulator 15. Oscillator 16 connects via line 17 to a first input of modulator 18. Oscillator 19 connects via line 20 to a second input of each of modulators 15 and 18. The outputs of modulators 15 and 18 connect in common via line 21 to transmitting antenna 22. Receiving subsystem 12 includes receiving antenna 23 which connects via line 24 to the inputs of receivers 25 and 26. The output of receiver 25 connects via line 27 to a first input of phase meter 28. The output of receiver 26 connects via line 29 to the second input of phase meter 28.

The propagation velocity of an electromagnetic wave through free space is generally regarded as a constant of nature which is independent of frequency. However, the propagation velocity of an electromagnetic wave through a material substance will depend on the properties of that substance at the frequency or frequencies of the signal(s). If the properties of the substance vary with frequency, the electromagnetic propagation velocity may also vary with frequency.

The relative dielectric constants of gases at normal temperatures and pressures are generally slightly more than one. The dielectric constant of an individual gas may be regarded as the dielectric constant of free space plus a small additional quantity due to the interaction between the gas and an alternating electric field. An atom, molecule or group of molecules may resonate at one or more frequencies. Above a given resonant frequency, a dielectric is less able to interact with an alternating electric field. Hence, the dielectric constant of a substance will generally decrease with increasing frequency.

The propagation velocity of an electromagnetic wave through a medium is inversely proportional to the square root of the product of the dielectric constant and the magnetic permeability. Most substances have magnetic permeabilities very nearly equal to that of free space. Hence, the velocity of propagation is generally inversely proportional to the square root of the dielectric constant. Since the dielectric constant generally decreases with frequency, the propagation velocity of an electromagnetic wave through a medium generally increases with increasing frequency. Hence, two electromagnetic wave signals of different and properly chosen frequencies may be expected to propagate through a given medium with different velocities. A well known example is the splitting of white light into colors by a prism. Blue light, having a higher frequency, has a different propagation velocity and is refracted differently than is red light. This effect also accounts for the formation of rainbows in the atmosphere.

In the system of FIGURE 1, the frequencies of oscillators 13 and 16 are chosen such that the corresponding electromagnetic wave signals will propagate through the atmosphere with desired different propagation velocities. The output signals of oscillators 13 and 16 are simultaneously modulated by modulators 15 and 18, combined and transmitted by antenna 22. Since both of the signals transmitted by antenna 22 are modulated in accordance with a signal from oscillator 19, their modulation phases will be substantially identical when they are transmitted from antenna 22. The two signals propagate through the atmosphere, are received by antenna 23 and demodulated by receivers 25 and 26. The receiver outputs on lines 27 and 29 will be signals corresponding to the output of oscillator 19 on line 20, but whose phases are determined in part by the transmission time between antennas 22 and 23. Hence, the phase difference of the signals on lines 27 and 29, as measured by phase meter 28, will be a measure of the difference in the propagation times of the two signals between antennas 22 and 23. This difference in propagation time will be proportional to a product of the difference in propagation velocity and the distance between antennas 22 and 23.

With transmission through a known atmosphere and with a known difference in propagation velocity, this measured phase difference will be a measure of the distance between antennas 22 and 23. Thus, the distance between antennas 22 and 23 may be measured by transmitting signals from a first station to a second station, without retransmitting signals back to the first station. If the density and/or composition of the atmosphere varies, or if one or both of antennas 22 and 23 is at a different, variable or unknown altitude, the phase difference measured by phase meter 28 will depend on the average density and composition of the atmosphere along the transmission path as well as the distance.

In the previously mentioned application of measuring the distance of an aircraft from a ground station, a transmitting subsystem such as subsystem 11 would be at the ground station, and a receiving subsystem such as subsystem 12 would be on board the aircraft. A knowledge of the barometric altitude of the aircraft and of weather conditions would allow the average difference in propagation velocity along the transmission path to be computed. The measured difference in transmission time would then provide a measure of the distance from the ground station.

In the radar traffic control example illustrated by FIGURE 3, the distance of an individual aircraft from the radar center may be accurately measured by conventional radar methods. If an aircraft transponder transmits appropriate signals of different frequencies from antenna 22 in response to an interrogation signal from the ground radar antenna 30, the difference in propagation time may be measured in the manner shown in FIGURE 1. Referring to FIGURE 1 and FIGURE 3, antenna 22 on the aircraft and antenna 23 on the earth correspond to the transmitting antenna of subsystem 11 and receiving antenna of subsystem 12 respectively. With a knowledge of the aircraft distance and of weather conditions, this measurement would then allow the determination of the average air density along the propagation path and, hence, the aircraft altitude.

Reference is now made to FIGURE 2 which illustrates a second form of the invention, employing a combination of optical and electronic techniques. FIGURE 2 includes transmitting subsystem 31 and receiving subsystem 32. Transmitting subsystem 31 includes light sources 33 and 34. The light output of source 33 travels along path 35, is reflected by mirror 36 along path 37, and is partially reflected by beam-splitting mirror 38 to travel along path 39 to modulator 40. The light output of source 34 travels along path 41, through beam-splitting mirror 38 and along path 39 to modulator 40. The output of oscillator 42 connects via line 43 to modulator 40. Sources 33 and 34 provide essentially monochromatic light of different frequencies or wavelengths. Modulator 40 may be a Kerr cell or other suitable device to modulate the light passing therethrough in accordance with signals from oscillator 42. Light passing through modulator 40 passes along path 44 to beam-splitting mirror 45 of receiving subsystem 32. The light is partially reflected by mirror 45 to travel along path 46 to mirror 47. At mirror 47, the light is again reflected to travel along path 48 to detector 49. Light traveling along path 44 is also partially transmitted through beam-splitting mirror 45 to travel along path 50 to detector 51. The output of detector 49 connects via line 52 to a first input of phase meter 53. The output of detector 51 connects via line 54 to the second input of phase meter 53.

The operation of the system of FIGURE 2 generally resembles the operation of the system of FIGURE 1. Detector 49 is sensitive only to light of the wavelength emitted by source 33, and detector 51 is sensitive only to light of the wavelength emitted by source 34. Detectors 49 and 51 function as optical receivers. The outputs on lines 52 and 54 are demodulated signals corresponding to the signals generated by modulating oscillator 42. The difference in phase of the outputs on lines 52 and 54 will be a measure of the difference in propagation time of the signals generated by sources 33 and 34. As before, path 44 may be a transmission path through the atmosphere. Knowing the frequencies of the light emitted by sources 33 and 34, the phase difference between the signals on lines 52 and 54 will be a measure of the length of path 44.

The term "light," as in the description of FIGURE 2, is not intended to be restrictive to visible light but may include infrared or ultraviolet radiation as well as visible light.

If desired, the systems of FIGURES 1 and 2 may be employed with various reflectors. For example, both subsystems 11 and 12 of FIGURE 1 may be placed at a first location and electromagnetic signals transmitted to and from a distant reflector. Similar techniques may be employed with the system of FIGURE 2.

The systems of FIGURES 1 and 2 have shown the generation of signals of particular frequencies and the separate modulation thereof. Such systems may employ amplitude modulation as an obvious and convenient choice of modulation method. However, frequency, phase, pulse and/or other forms of modulation may be used in addition to, or in place of, amplitude modulation. The two signals may or may not be modulated in the same manner. The signal generation and modulation processes may be separate or combined.

The systems of FIGURES 1 and 2 have shown the measurement of distance via the transmission of two electromagnetic wave signals of different propagation velocities. In some instances it may be desirable to use more than two transmitted signals.

FIGURE 1 has shown the use of radio equipment for the transmission and measurement of two electromagnetic wave signals of different frequencies. FIGURE 2 has shown the use of optical equipment for a similar purpose. If desired, both radio and optical equipment may be used in a single system. For example, such a system may measure the difference in travel time between a radio frequency signal and an optical frequency signal.

FIGURES 1 and 2 have shown the use of a phase meter for the measurement of a difference of transmission time of two signals. Many other forms of time difference measurement may also be used within the spirit of this invention. For example, variable delay line(s) may be inserted in lines 27 and/or 29 of FIGURE 1. One or both of the delay line(s) would be adjusted until the output signals were coincident in time. The time of arrival difference would then be indicated by the setting(s) of the variable delay line(s).

The preceding specification has described the use of the present invention for the measurement of distances in the atmosphere. Similar techniques may also be used for the measurement of distances within water, or other substances.

The term "distance" in the claims is intended to include quantities such as relative and/or absolute altitude, and other means of describing physical separation, as well as straight line or slant range distance. The term "electromagnetic wave signal" is intended to include visible and nonvisible light as well as radio wave signals.

What is claimed is:

1. Apparatus for making a measurement of an electromagnetic transmission path through a medium having a frequency dependent electromagnetic wave propagation velocity, the measurement being dependent upon path length and medium composition, comprising means for generating two electromagnetic wave signals of different frequencies, a source of modulation signal, means for modulating each of the two signals with the modulation signal, means for transmitting the two modulated signals over the path, means for receiving the two modulated signals after travel along the path, means for demodulating the received signals, and means responsive to the output of the means for demodulating for measuring the difference in time of travel of the two signals over the path.

2. A method of measuring the length of a transmission path for electromagnetic waves including the steps of; providing two electromagnetic signals of different frequency, modulating said electromagnetic wave signals with a common separate modulating signal, transmitting said signals over the transmission path to signal receiving means, demodulating said signals at the receiving means, and measuring the phase difference of the demodulated signals.

3. Altitude measurement means comprising means for measuring the straight-line path distance between a station on the earth and an object above the earth's surface and in the earth's atmosphere, means for transmitting two electromagnetic wave signals having a known difference of atmospheric propagation velocity over the straight-line path, and means for measuring the difference of propagation time of the wave signals over the path, whereby a comparison of the straight-line path distance and the propagation time difference defines atmospheric altitude of the object above the earth.

References Cited

UNITED STATES PATENTS

| 2,198,113 | 4/1940 | Holmes | 343—105 X |
| 3,040,315 | 6/1962 | Kramer. | |

RICHARD A. FARLEY, *Primary Examiner.*

RODNEY D. BENNETT, *Examiner.*

D. C. KAUFMAN, *Assistant Examiner.*